United States Patent
Li et al.

(10) Patent No.: US 9,769,840 B2
(45) Date of Patent: Sep. 19, 2017

(54) METHOD AND APPARATUS FOR SCHEDULING USER EQUIPMENT

(75) Inventors: Chaofeng Li, Beijing (CN); Yu Zhang, Beijing (CN); Ming Lei, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 281 days.

(21) Appl. No.: 14/384,337

(22) PCT Filed: Aug. 22, 2012

(86) PCT No.: PCT/CN2012/080461
§ 371 (c)(1),
(2), (4) Date: Dec. 16, 2014

(87) PCT Pub. No.: WO2014/029085
PCT Pub. Date: Feb. 27, 2014

(65) Prior Publication Data
US 2015/0156792 A1    Jun. 4, 2015

(51) Int. Cl.
*H04W 72/12* (2009.01)
*H04W 76/02* (2009.01)
(Continued)

(52) U.S. Cl.
CPC ....... *H04W 72/1205* (2013.01); *H04W 52/12* (2013.01); *H04W 52/242* (2013.01);
(Continued)

(58) Field of Classification Search
CPC ............. H04W 52/243; H04W 52/146; H04W 72/082; H04W 76/023; H04W 88/04;
(Continued)

(56) References Cited

U.S. PATENT DOCUMENTS

| 8,559,360 B2* | 10/2013 | Kim | .......... H04W 52/146 370/318 |
| 9,313,746 B2* | 4/2016 | Li | .......... H04W 52/241 |

(Continued)

FOREIGN PATENT DOCUMENTS

| CN | 101990290 A | 3/2011 |
| CN | 102497221 A | 6/2012 |

(Continued)

OTHER PUBLICATIONS

International Search Report of PCT/CN2012/080461 dated May 2, 2013.
(Continued)

*Primary Examiner* — Matthew Sams
(74) *Attorney, Agent, or Firm* — Sughrue Mion, PLLC

(57) ABSTRACT

Embodiments of the disclosure provide methods and apparatuses for scheduling a UE in a communication system comprising D2D communication and cellular communication. The cellular communication is performed between a base station (BS) and at least one UE, and the D2D communication is performed between a D2D transmitter and a D2D receiver. According to the method of the present invention, an outage margin of the D2D communication is obtained, wherein the outage margin indicates the margin that the communication from the D2D transmitter to the D2D receiver is in outage; and a target transmission power of the at least one UE is determined based on the outage margin to perform cellular scheduling.

20 Claims, 5 Drawing Sheets

(51) Int. Cl.
*H04W 52/12* (2009.01)
*H04W 52/24* (2009.01)
*H04W 52/38* (2009.01)

(52) U.S. Cl.
CPC ........ *H04W 76/023* (2013.01); *H04W 52/383* (2013.01); *H04W 72/12* (2013.01)

(58) Field of Classification Search
CPC ............. H04W 52/244; H04W 52/383; H04W 72/085; H04W 92/18; H04W 28/04; H04W 52/226; H04W 52/241; H04W 52/245; H04W 52/248; H04W 52/34; H04B 7/2606
See application file for complete search history.

(56) References Cited

U.S. PATENT DOCUMENTS

| | | | | |
|---|---|---|---|---|
| 2010/0093364 A1* | 4/2010 | Ribeiro | ............... | H04W 72/082 455/452.2 |
| 2010/0167743 A1* | 7/2010 | Palanki | .................. | H04B 7/155 455/436 |
| 2010/0208687 A1* | 8/2010 | Lim | ...................... | H04L 5/0044 370/329 |
| 2011/0028179 A1 | 2/2011 | Sawai et al. | | |
| 2011/0141933 A1* | 6/2011 | Kim | .................... | H04W 52/146 370/252 |
| 2011/0154145 A1* | 6/2011 | Lomnitz | ............... | H04L 1/0002 714/749 |
| 2011/0228666 A1* | 9/2011 | Barbieri | ............. | H04W 76/023 370/216 |
| 2011/0243010 A1* | 10/2011 | Geirhofer | ............. | H04W 52/08 370/252 |
| 2012/0077510 A1 | 3/2012 | Chen et al. | | |
| 2012/0226930 A1* | 9/2012 | Colban | .................. | H04W 72/06 713/340 |
| 2013/0083722 A1* | 4/2013 | Bhargava | ............ | H04W 72/085 370/315 |
| 2013/0195026 A1* | 8/2013 | Johnsson | .......... | H04W 72/0493 370/329 |
| 2013/0231153 A1* | 9/2013 | Guillet | ................ | H04W 52/243 455/522 |
| 2013/0344913 A1* | 12/2013 | Li | ........................ | H04W 52/244 455/522 |
| 2014/0171062 A1* | 6/2014 | Fallgren | ................ | H04W 40/22 455/422.1 |
| 2015/0156792 A1* | 6/2015 | Li | ......................... | H04W 52/12 455/450 |
| 2015/0296394 A1* | 10/2015 | Svedman | .............. | H04L 47/266 370/223 |

FOREIGN PATENT DOCUMENTS

| | | | | |
|---|---|---|---|---|
| JP | 2011166721 A | | 8/2011 | |
| WO | 2011/123799 A1 | | 10/2011 | |
| WO | WO 2011123799 A1 | * | 10/2011 | ............ H04W 52/08 |
| WO | 2012015698 A1 | | 2/2012 | |

OTHER PUBLICATIONS

Written Opinion of the International Searching Authority of PCT/CN2012/080461 dated May 2, 2013.
Communication dated Oct. 6, 2015 from the Japanese Office Action issued in corresponding application No. 2014-560217.
P. Popovski, et al., Outage Margin and Power Constraints in Cognitive Radio with Multiple Antennas, IEEE 2009, pp. 111-115.
Communication dated Mar. 31, 2017 issued by the State Intellectual Property Office of People's Republic of China in application No. 2012800658528.

* cited by examiner

400

Start

↓

S401 acquire a path loss of one of the at least one UE to the D2D receiver

↓

S402 determine whether whether an outage probability caused by the one of the at least one UE will exceed an outage probability threshold based on the acquired path loss and the outage margin

↓

S403 in response to determining that the outage probability caused by the one of the at least one UE will exceed an outage probability threshold, set the target transmission power of the one of the at least one UE as zero

↓

End

Start

S501 acquire a path loss of one of the at least one UE to the D2D receiver

S502 adjust the outage margin according to a UE number limit, wherein the UE number limit indicates the upper limit of one or more UEs to be involved in the cellular scheduling S503 determine whether an outage probability caused by the one of the at least one UE will exceed an outage probability threshold based on the acquired path loss and the adjusted outage margin S504 in response to determining that the outage probability caused by the one of the at least one UE will exceed an outage probability threshold, set the target transmission power of the one of the at least one UE as zero End

METHOD AND APPARATUS FOR SCHEDULING USER EQUIPMENT

CROSS REFERENCE TO RELATED APPLICATIONS

This is a National Stage of International Application No. PCT/CN2012/080461 filed Aug. 22, 2012, the contents of which are incorporated herein by reference in its entirety.

FIELD OF THE INVENTION

Embodiments of the present invention generally relate to communication techniques. More particularly, embodiments of the present invention relate to a method and apparatus for scheduling a user equipment (UE) in a communication system comprising Device-to-Device (D2D) communication and cellular communication.

BACKGROUND OF THE INVENTION

In practical communication networks, such as networks employs GSM, CDMA, UMTS and LTE technologies, wireless communication users' demand for faster, more reliable, and better multimedia is growing. To accommodate such a growing demand, schemes capable of providing a higher throughput have being researched.

In the last few years, increasing demand of offloading cellular traffic has attracted attention from most industrial partners to D2D communication. The aim of D2D communication is pursuing this track to allow D2D devices, e.g., a D2D transmitter and a D2D receiver, to transmit data to each other without, or with limited help from the cellular infrastructure. Proximal D2D devices may allow high-data-rate, low-delay and low-power transmission; meanwhile, single hop communication substitutes the uplink-downlink transmission in the traditional cellular mode, such that the network resource can be saved.

In order to efficiently utilizing spectrum, same frequency band is allowed to be shared by at least one cellular user equipment (CUE) (hereafter "user equipment (UE)") and the D2D devices. In such a case, the D2D communication may be interfered by the cellular communication in uplink session. Specifically, when UE(s) performs transmission to a cellular base station (CBS) (hereafter "base station (BS)") managing the cell, the transmission may interfere with the D2D receiver and degrade the D2D communication quality. The interference would highly reduce the D2D and cell throughput of the communication system.

In view of the foregoing problem, there is a need to reduce the interference from the cellular communication to the D2D communication in the uplink session, so as to improve the D2D and cell throughput of the communication system comprising both the D2D communication and the cellular communication.

SUMMARY OF THE INVENTION

The present invention proposes a solution to coordinate the interference from uplink cellular communication to the D2D communication by scheduling cellular UE (s). In the proposed solution, an outage-oriented interference limit criteria is proposed such that the UE(s) which may have strong interference are in disadvantage when competing with other UE(s) in cellular uplink scheduling. Specifically, the present invention provides a method and apparatus for scheduling UE(s) in a communication system with D2D communication, which can effectively improve the D2D and cell throughput of the communication system comprising both the D2D communication and the cellular communication.

According to a first aspect of embodiments of the present invention, embodiments of the invention provide a method for scheduling a UE in a communication system comprising D2D communication and cellular communication. The cellular communication is performed between a BS and at least one UE, and the D2D communication is performed between a D2D transmitter and a D2D receiver. The method may comprise: obtaining an outage margin of the D2D communication, wherein the outage margin indicates the margin that the communication from the D2D transmitter to the D2D receiver is in outage; and determining, based on the outage margin, a target transmission power of the at least one UE to perform cellular scheduling.

According to a second aspect of embodiments of the present invention, embodiments of the invention provide an apparatus for scheduling a UE in a communication system comprising D2D communication and cellular communication. The cellular communication is performed between a BS and at least one UE, and the D2D communication is performed between a D2D transmitter and a D2D receiver. The apparatus may comprise: an obtaining unit configured to obtain an outage margin of the D2D communication, wherein the outage margin indicates the margin that the communication from the D2D transmitter to the D2D receiver is in outage; and a determining unit configured to determine, based on the outage margin, a target transmission power of the at least one UE to perform cellular scheduling.

Compared with those existing solutions, the proposed solution mitigates the potential interference from one or more UEs to the D2D Rx, such that less outage for the D2D link is expected. Meanwhile, the proposed solution effectively improves cellular throughput, as well as spectral efficiency, of the communication system comprising both the D2D communication and the cellular communication.

Other features and advantages of the embodiments of the present invention will also be apparent from the following description of specific embodiments when read in conjunction with the accompanying drawings, which illustrate, by way of example, the principles of embodiments of the invention.

BRIEF DESCRIPTION OF THE DRAWINGS

Embodiments of the invention are presented in the sense of examples and their advantages are explained in greater detail below, with reference to the accompanying drawings, where

FIG. 4 illustrates a flow chart of a method 400 for determining UE's target transmission power to perform cellular scheduling according to embodiments of the invention;

FIG. 5 illustrates a flow chart of a method 500 for determining UE's target transmission power to perform cellular scheduling according to embodiments of the invention;

Throughout the figures, same or similar reference numbers indicate same or similar elements.

DETAILED DESCRIPTION OF EMBODIMENTS

Figure 1:
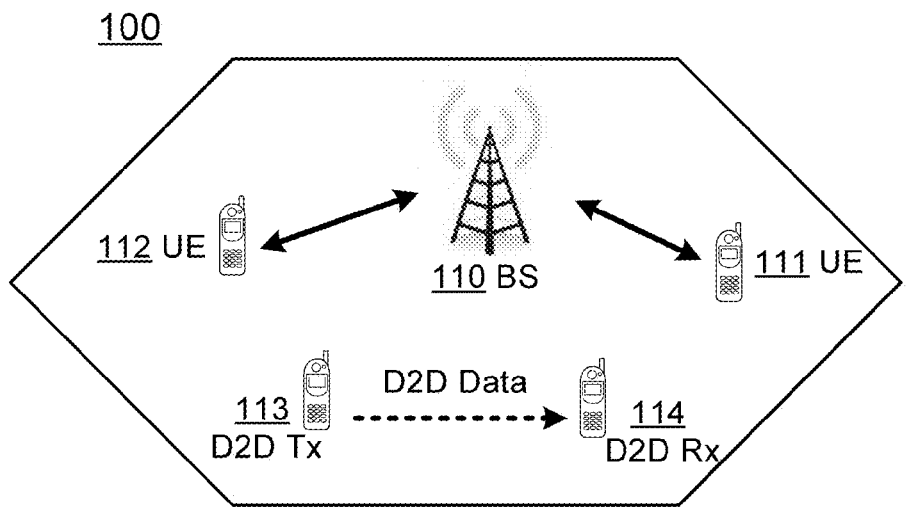
FIG. 1 illustrates a schematic diagram of a communication system 100 comprising D2D communication and cellular communication.

Various embodiments of the present invention are described in detail with reference to the drawings. The flowcharts and block diagrams in the figures illustrate the apparatus, method, as well as architecture, functions and operations executable by a computer program product according to the embodiments of the present invention. In this regard, each block in the flowcharts or block may represent a module, a program, or a part of code, which contains one or more executable instructions for performing specified logic functions. It should be noted that in some alternatives, functions indicated in blocks may occur in an order differing from the order as illustrated in the figures. For example, two blocks illustrated consecutively may be actually performed in parallel substantially or in an inverse order, which depends on related functions. It should also be noted that block diagrams and/or each block in the flowcharts and a combination of thereof may be implemented by a dedicated hardware-based system for performing specified functions/operations or by a combination of dedicated hardware and computer instructions.

In the disclosure, a user equipment (UE) or a cellular user equipment (CUE) may refer to a terminal, a Mobile Terminal (MT), a Subscriber Station (SS), a Portable Subscriber Station (PSS), Mobile Station (MS), or an Access Terminal (AT), and some or all of the functions of the UE, the terminal, the MT, the SS, the PSS, the MS, or the AT may be included. Note that the term "UE" and the term "CUE" can be exchangeable in the context of the disclosure.

In the disclosure, the terms a base station (BS) and a cellular base station (CBS) have the same meaning in this disclosure. A BS or a CBS may represent, e.g., a node B (NodeB or NB), an evolved NodeB (eNodeB or eNB), a radio header (RH), a remote radio head (RRH), a relay, a low power node such as a femto, a pico, or any other suitable device. Note that the term "BS" and the term "CBS" can be exchangeable in the context of the disclosure.

According to embodiments of the present invention, a communication system comprises a BS, at least one UE, a D2D transmitter and a D2D receiver, the BS manages a cell, and the at least one UE, the D2D transmitter and the D2D receiver are within the cell.

It is to be noted that, the D2D devices comprising the D2D transmitter and the D2D receiver may be same as or similar to the traditional user equipments. For example, the D2D transmitter or the D2D receiver may be the terminal, the MT, the SS, the PSS, the MS, or the AT, etc. In some cases, when proximal UEs want to communicate with each other, they may perform the D2D communication without or with limit help of the CBS. That is, the D2D transmitter and the D2D receiver may communicate with each other in the D2D communication, independent from the cellular communication. In some other cases, when the D2D devices do not perform the D2D communication, they may again become UEs to be served by the CBS in the cellular communication.

Embodiments of the present invention provide a method and apparatus for scheduling UE(s) in a communication system comprising both the D2D communication and the cellular communication. As further discussed below, in some embodiments, the interference from one or more cellular UEs to the D2D receiver may be mitigated by considering revised powers of the UEs when scheduling these UEs. The revised power is also referred as target transmission power in the context of the disclosure. The target transmission powers of the UEs may be determined based on outage margin of the D2D communication to perform cellular scheduling. With the cellular scheduling performed based on the target transmission power, the D2D and cell throughput of the communication system may be effectively improved. Now some exemplary embodiments of the present invention will be described below with reference to the figures.

Reference is first made to FIG. 1, which illustrates a schematic diagram of a communication system 100 comprising D2D communication and cellular communication.

The communication system of FIG. 1 may be implemented with a GSM system, a CDMA system, a UMTS system, a LTE system, etc. The system illustratively comprises a BS 110, a UE 111, a UE 112, a D2D transmitter 113 and a D2D receiver 114. In the system, the UE 111 and the UE 112 are being served by the BS 110, specifically, the UE 111 and the UE 112 are communicating with the BS 110 (that is to say, the UE 111 and the UE 112 are in cellular communication with the BS 110). Meanwhile, the D2D transmitter 113 and the D2D receiver 114 are in D2D communication, specifically, the D2D transmitter 113 is transmitting D2D data to the D2D receiver 114. The D2D transmission schemes shows in As can be seen from FIG. 1, during the D2D communication, especially when the D2D receiver 114 is receiving D2D data from the D2D transmitter 113, the D2D receiver 114 may suffer the interference from the UE 111 and/or the UE 112 in uplink session of the cellular communication.

It is to be noted that, according to other embodiments of the present invention, the communication system may comprise one or more UEs in cellular communication with the BS. Although FIG. 1 only shows two cellular UEs, the UE 111 and the UE 112, those skilled in the art will appreciated that they are shown only for example, not for limitation.

For better understanding, the following embodiments of the present disclosure are described based on the communication system shown in FIG. 1. As can be appreciated by those skilled in the art, the present disclosure can be applicable to any other suitable communication system, but not limited to the specific arrangement shown in FIG. 1.

Figure 2:
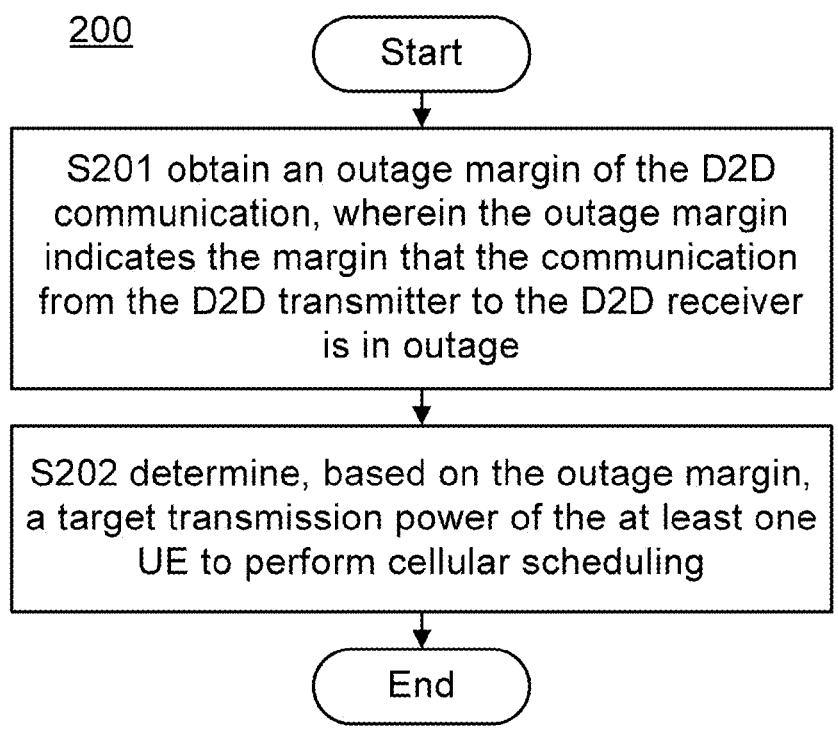
FIG. 2 illustrates a flow chart of a method 200 for scheduling a UE in a communication system comprising D2D communication and cellular communication according to embodiments of the invention.

Reference is now made to FIG. 2, which illustrates a flow chart of a method 300 for scheduling a UE in a communication system comprising the D2D communication and the cellular communication according to embodiments of the invention. According to embodiments of the present invention, the cellular communication may be performed between a BS and at least one UE, and the D2D communication may be performed between a D2D transmitter and a D2D receiver. According to embodiments of the present invention, the communication system may be implemented with a GSM system, a CDMA system, a UMTS system, a LTE system, etc., such as the system illustrated in FIG. 1. In accordance with embodiments of the present invention, the method 200 may be carried out by, for example, a base station, a base station controller (BSC), a gateway, a relay, a server, a central unit, or any other applicable device.

After method 200 starts, at step S201, an outage margin of the D2D communication is obtained, wherein the outage margin indicates the margin that the communication from the D2D transmitter to the D2D receiver is in outage.

According to embodiments of the present invention, there may be several ways to obtain the outage margin of the D2D communication.

In some embodiments according to the present invention, the outage margin may be obtained by acquiring a path loss of the D2D transmitter to the D2D receiver, power limit of the D2D transmitter and power of Gaussian noise at the D2D receiver; regulating transmission rate of the D2D communication and outage probability threshold of the D2D communication; and obtaining the outage margin based on the path loss of the D2D transmitter to the D2D receiver, the power limit of the D2D transmitter, the power of Gaussian noise at the D2D receiver, the transmission rate of the D2D communication and the outage probability threshold of the D2D communication. Relevant details may be found in descriptions with respect to FIG. 3.

In some other embodiments according to the present invention, the outage margin may be preset or predetermined, e.g., according to the communication system configurations and/or requirements, experiences of the operator, the provider, the vendor, etc.

At step S202, a target transmission power of the at least one UE is determined based on the outage margin to perform cellular scheduling.

According to embodiments of the present invention, the target transmission power of the at least one UE may be determined in multiple ways based on the outage margin, so that the subsequent cellular scheduling may utilize the target transmission power to mitigate the interference from the cellular communication to the D2D communication.

In accordance with embodiments of the present invention, a path loss of one of the at least one UE to the D2D receiver may be first acquired, and then whether an outage probability caused by the one of the at least one UE will exceed an outage probability threshold may be determined based on the acquired path loss and the outage margin, and the target transmission power of the one of the at least one UE may be set as zero in response to determining that the outage probability caused by the one of the at least one UE will exceed the outage probability threshold. In this way, the target transmission power of the at least one UE may be determined to be used in the subsequent cellular scheduling. Relevant details may be found in descriptions with respect to FIG. 4.

In accordance with further embodiments of the present invention, the target transmission power of the at least one UE may be determined as below. A path loss of one of the at least one UE to the D2D receiver may be first acquired; the outage margin may be adjusted according to a UE number limit, wherein the UE number limit indicates the upper limit of one or more UEs to be involved in the cellular scheduling; whether an outage probability caused by the one of the at least one UE will exceed an outage probability threshold may be determined based on the acquired path loss and the adjusted outage margin; and in response to determining that the outage probability caused by the one of the at least one UE will exceed the outage probability threshold, setting the target transmission power of the one of the at least one UE as zero. Relevant details may be found in descriptions in connection with FIG. 5.

In accordance with further more embodiments of the present invention, the target transmission power of the at least one UE may be determined, e.g., by acquiring a path loss of one of the at least one UE to the D2D receiver and full power of the one of the at least one UE; adjusting the outage margin according to a UE number limit, wherein the UE number limit indicates the upper limit of one or more UEs to be involved in the cellular scheduling; and determining the target transmission power of the one of the at least one UE based on the acquired path loss, the acquired full power and the adjusted outage margin. Relevant details may be found in descriptions in connection with FIG. 6.

It is to be noted that there may be some other solutions for determining the UE's target transmission power, and the above embodiments are described only for illustration, not limitation.

According to embodiments of the present invention, it is assumed that the D2D transmitter applies its full power in the first place, and evenly divides the margin at the D2D receiver side. In this fashion, the power limit for each UE (CUE) which is close to the D2D receiver may be derived. The cellular network scheduler, e.g., the BS (CBS) will make the decision on this power limitation from each CUE, and select the group of CUEs which have the potential to make the greatest contribution to the cellular throughput.

Figure 3:
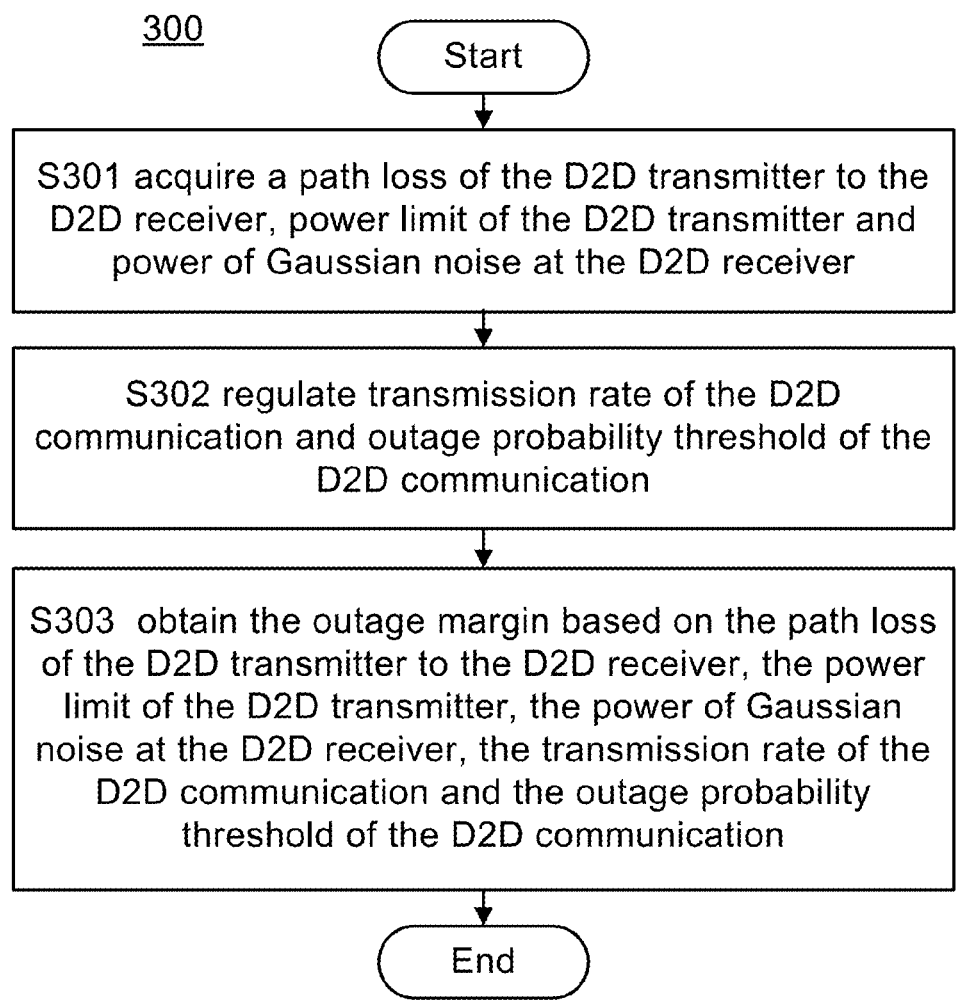
FIG. 3 illustrates a flow chart of a method 300 for obtaining an outage margin of the D2D communication according to embodiments of the invention.

Reference is now made to FIG. 3, which illustrates a flow chart of a method 300 for obtaining an outage margin of the D2D communication according to embodiments of the invention. The flow chart as shown in FIG. 3 illustrates a process for obtaining the outage margin, which is an embodiment for implementing step S201 of the method 200 illustrated in FIG. 2.

At step S301, a path loss of the D2D transmitter to the D2D receiver, power limit of the D2D transmitter and power of Gaussian noise at the D2D receiver are acquired.

According to embodiments of the present invention, the path loss of the D2D transmitter to the D2D receiver may be obtained at the D2D receiver by receiving reference signals from the D2D transmitter and calculating the path loss based on the reference signals received during a period of time. Alternatively, the path loss may be calculated based on GPS information of the D2D transmitter and the D2D receiver. Additionally, the pass loss may be obtained according to proper means or methods known in the art.

The power limit of a UE may be preset or predetermined, e.g., in existing or future communication standard, or according to the communication system configurations and/or requirements, experiences of the operator, the provider, the vendor, etc. For example, the power limit of the D2D transmitter may be preset or predetermined in the standard associated with a LTE system.

Power of Gaussian noise at the D2D receiver may be obtained based on reference signals. Those skilled in the art will readily understand that there are several ways to obtain the power of Gaussian noise, so details are not addressed in context of the disclosure.

At step S302, transmission rate of the D2D communication and outage probability threshold of the D2D communication are regulated.

In accordance with embodiments of the present invention, the transmission rate and the outage probability threshold of the D2D communication may be regulated in multiple ways. For example, the transmission rate and/or the outage probability threshold may be preset or predetermined, e.g., according to the communication system configurations and/or requirements, experiences of the operator, the provider, the vendor, etc.

According to embodiments of the present invention, the transmission rate indicates the rate requirement for the D2D devices, which is also the rate outage probability threshold at the D2D receiver According to embodiments of the present invention, the outage probability threshold of the D2D communication indicates outage probability constraint for the D2D link. The outage may not go beyond the outage probability threshold, e.g., 5% or so.

At step S303, the outage margin is obtained based on the path loss of the D2D transmitter to the D2D receiver, the power limit of the D2D transmitter, the power of Gaussian noise at the D2D receiver, the transmission rate of the D2D communication and the outage probability threshold of the D2D communication.

In some embodiments of the present invention, the path loss of the D2D transmitter to the D2D receiver is denoted as $\bar{g}_d$, the power limit of the D2D transmitter is denoted as $P_d$, the power of Gaussian noise at the D2D receiver is denoted as $\sigma^2$, the transmission rate of the D2D communication is denoted as $R_d$ and the outage probability threshold of the D2D communication is denoted as $\epsilon$, the outage margin denoted as OM may be calculated by:

$$OM = -\frac{\sigma^2}{\lambda_0} - \log(1-\varepsilon), \quad (1)$$

wherein $\lambda_0 = \bar{g}_d P_d/(e^{R_d}-1)$.

It is to be noted that the outage margin may be calculated in several other ways besides equation (1), and the above equation (1) are illustrated for purpose of example, rather than limitation.

Reference is now made to FIG. 4, which illustrates a flow chart of a method 400 for determining UE's target transmission power to perform cellular scheduling according to embodiments of the invention. The flow chart as shown in FIG. 4 illustrates a process for determining the target transmission power of one or more UEs for cellular scheduling, which is an embodiment for implementing step S202 of the method 200 illustrated in FIG. 2.

After method 400 starts, at step S401, a path loss of one of the at least one UE to the D2D receiver is acquired.

According to embodiments of the present invention, the path loss of one of the at least one UE to the D2D receiver may be obtained in several ways. In an embodiment, the D2D receiver may be first notified to listen to reference signals transmitted from the one of the at least one UE to the BS, so that D2D receiver obtains the path loss of the one of the at least one UE to the D2D receiver; and then, the path loss of the one of the at least one UE to the D2D receiver may be acquired from the D2D receiver. For example, before the UE sends the reference signals, e.g. sounding reference signals (SRSs), the BS may notify the D2D receiver to listen to the SRSs. Upon receive the notification, the D2D receiver may listen to the SRSs, obtain the path loss of the one of the at least one UE to the D2D receiver based on the listening results, and report the obtained path loss to the BS. In this way, the BS may acquire the path loss of the one of the at least one UE to the D2D receiver from the D2D receiver.

In accordance with embodiments of the present application, it is assumed that there are N (N is an integer no less than 1) cellular UEs in the communication system, and the path loss of the $i^{th}$ UE to the D2D receiver is denoted as $\bar{g}_{i,d}$, wherein i=1, . . . , N.

At step S402, whether an outage probability caused by the one of the at least one UE will exceed an outage probability threshold is determined based on the acquired path loss and the outage margin.

In accordance with embodiments of the present application, one scheme for determining whether an outage probability caused by one UE will exceed an outage probability threshold may be implemented by determining a UE which is able to disqualify the D2D link outage from the outage probability threshold $\epsilon$. In other words, with respect to the $i^{th}$ UE, if the path loss of the $i^{th}$ UE to the D2D receiver exceeds a path loss threshold which is obtained based on the outage margin, the $i^{th}$ UE may be considered to be a UE which will cause an outage probability exceeding the outage probability threshold $\epsilon$. The outage probability may indicate a probability that the interference from a UE leads the D2D communication to be in outage.

According to an embodiment of the present invention, the path loss threshold to be compared with the path loss of a UE to the D2D communication may be set as below:

$$\left(e^{-\frac{\sigma^2}{\lambda_0}-\log(1-\epsilon)}-1\right)\lambda_0/\bar{P}_c. \quad (2)$$

As such, the $i^{th}$ UE may be considered as a UE which will cause an outage probability exceeding the outage probability threshold, if $$\bar{g}_{i,d} \geq \left(e^{-\frac{\sigma^2}{\lambda_0}-\log(1-\epsilon)}-1\right)\lambda_0/\bar{P}_c, \quad (3)$$

wherein $\bar{P}_c$ indicates the full power or power limit for the $i^{th}$ UE.

At step S403, in response to determining that the outage probability caused by the one of the at least one UE will exceed the outage probability threshold, the target transmission power of the one of the at least one UE is set as zero.

With respect to the above embodiment, responsive to that the $i^{th}$ UE is determined to be a UE which will cause an outage probability exceeding the outage probability threshold, the $i^{th}$ UE may be selected from the one or more cellular UEs. Subsequently, the target transmission power of the $i^{th}$ UE may be set as zero. In this way, the selected UE, e.g., the $i^{th}$ UE, will not be taken into account during the cellular scheduling.

It is to be noted that all of the N UE may be judged by iteratively performing steps S402-S403.

Reference is now made to FIG. 5, which illustrates a flow chart of a method 500 for determining UE's target transmission power to perform cellular scheduling according to embodiments of the invention. The flow chart as shown in FIG. 5 illustrates a process for determining the target transmission power of one or more UEs for cellular scheduling, which is an embodiment for implementing step S202 of the method 200 illustrated in FIG. 2.

After method 500 starts, at step S501, a path loss of one of the at least one UE to the D2D receiver is acquired.

Step S501 in method 500 corresponds to step S401 in method 400 as described above. Similar with step S401, the path loss of one of the at least one UE to the D2D receiver may be acquired at step S501.

At step S502, the outage margin is adjusted according to a UE number limit, wherein the UE number limit indicates the upper limit of one or more UEs to be involved in the cellular scheduling.

As discussed above, the outage margin indicates the margin that the communication from the D2D transmitter to the D2D receiver is in outage. Embodiments illustrated in connection with FIG. 2 have exemplarily described the procedures for obtaining the outage margin. Those skilled in the art will appreciated that the outage margin may be obtained in several other means.

In accordance with embodiments of the present invention, the UE number limit indicates the upper limit of one or more UEs to be involved in the cellular scheduling. Specifically, the UE number limit is the upper limit of total number of UEs which can be supported simultaneously by the BS (with multiple Antennas). For example, it is assumed that there are 10 UEs in total and one UE has a single antenna, but since BS only has 4 Tx/Rx antennas, the UE number limit is 4.

According to embodiments of the present invention, the outage margin may be adjusted in multiple ways as below.

For an example, an average outage margin may be calculated by dividing the outage margin by the UE number limit, and the outage margin may be updated with the average outage margin. Specifically, the adjusted outage margin (denoted as "$OM_{adjust}$") may be obtained as blow:

$$OM_{adjust} = \left(-\frac{\sigma^2}{\lambda_0} - \log(1-\varepsilon)\right) / |S|, \qquad (4)$$

wherein |S| represent the UE number limit which indicates the upper limit of one or more UEs to be involved in the cellular scheduling.

For another example, the outage margin may be adjusted by: calculating an average outage margin by dividing the outage margin by the UE number limit, calculating a weight for each of the at least one UE based on path loss or average channel gain of the each of the at least one UE to the D2D receiver, weighting the average outage margin by the calculated weight, and updating the outage margin with the weighted average outage margin.

At step S503, whether an outage probability caused by the one of the at least one UE will exceed an outage probability threshold is determined based on the acquired path loss and the adjusted outage margin.

Different from the embodiment illustrated in connection with FIG. 4, in embodiments with respect to FIG. 5, another scheme for determining whether an outage probability caused by the one of the at least one UE will exceed an outage probability threshold is introduced. Specifically, with respect to the $i^{th}$ UE, if the path loss of the $i^{th}$ UE to the D2D receiver exceeds a path loss threshold which is obtained based on the adjusted outage margin, the $i^{th}$ UE may be considered to be a UE which will cause an outage probability exceeding the outage probability threshold.

As can be seen, in the scheme of FIG. 5, it is assumed that D2D disqualification is not contributed from one single UE but the sum of all scheduled UEs. Accordingly, the adjusted outage margin, instead of the outage margin as originally obtained, is used to determine whether a UE is liable to put the D2D communication in disadvantage. Therefore, by evenly dividing the outage margin, the path loss threshold may be set as below:

$$\left(e^{\left(-\frac{\sigma^2}{\lambda_0} - \log(1-\varepsilon)\right)/|S|} - 1\right)\lambda_0 / \overline{P}_c. \qquad (5)$$

In this way, the $i^{th}$ UE may be considered as a UE belonging to a set of UEs (denoted as S) will cause an outage probability exceeding the outage probability threshold, if $$\overline{g}_{i,d} \geq \left(e^{\left(-\frac{\sigma^2}{\lambda_0} - \log(1-\varepsilon)\right)/|S|} - 1\right)\lambda_0 / \overline{P}_c. \qquad (6)$$

At step S504, in response to determining that the outage probability caused by the one of the at least one UE will exceed the outage probability threshold, the target transmission power of the one of the at least one UE is set as zero.

Step S504 in method 500 corresponds to step S403 in method 400 as described above. Similar with step S403, the target transmission power of the UE which causes an outage probability will exceed the outage probability threshold is set as zero at step S504, thus the UE will be excluded in the cellular scheduling.

Figure 6:
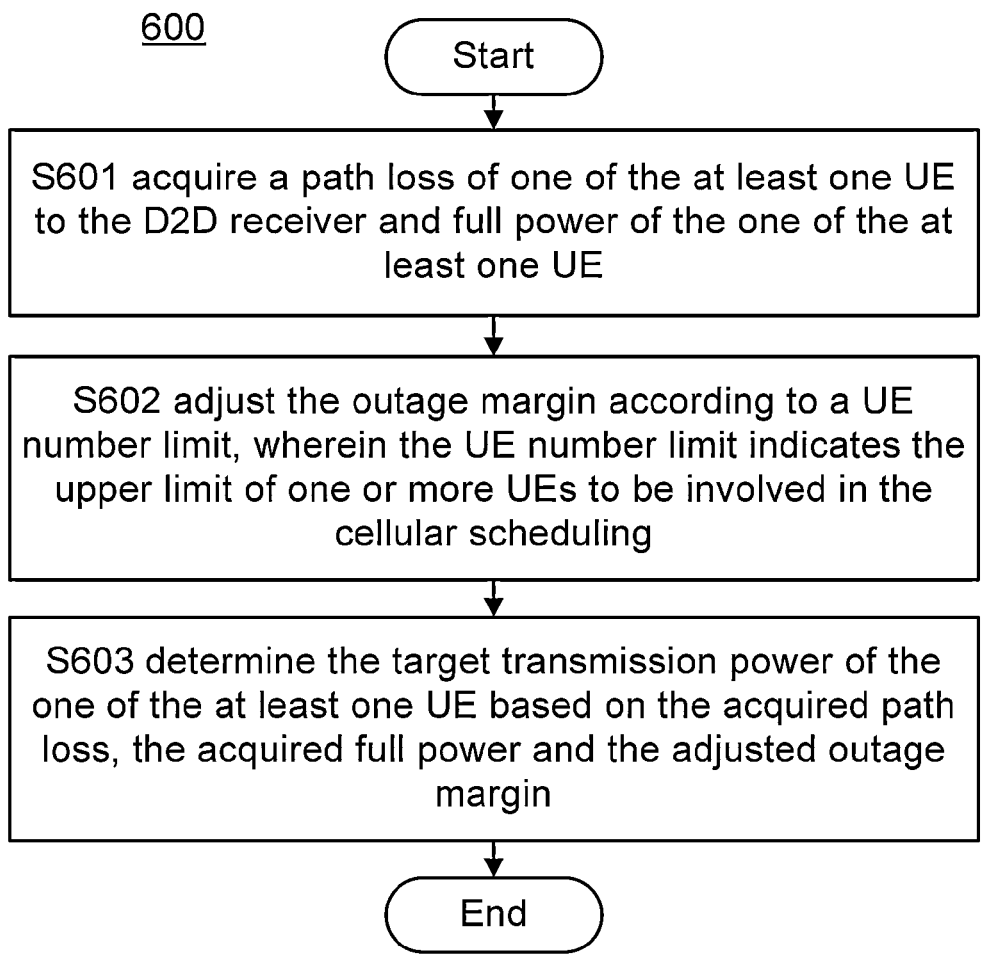
FIG. 6 illustrates a flow chart of a method 600 for determining UE's target transmission power to perform cellular scheduling according to embodiments of the invention.

Reference is now made to FIG. 6, which illustrates a flow chart of a method 600 for determining UE's target transmission power to perform cellular scheduling according to embodiments of the invention. The flow chart as shown in FIG. 6 illustrates a process for determining the target transmission power of one or more UEs for cellular scheduling, which is an embodiment for implementing step S202 of the method 200 illustrated in FIG. 2.

After method 600 starts, at step S601, a path loss of one of the at least one UE to the D2D receiver and full power of the one of the at least one UE are acquired.

Similar with step S401, the path loss of one of the at least one UE to the D2D receiver may be acquired at step S601 and may be denoted as $\overline{g}_{i,d}$, where i indicates the $i^{th}$ UE. In addition, full power of the one of the at least one UE may be also acquired, which may be denoted as $\overline{P}_c$.

At step S602, the outage margin is adjusted according to a UE number limit, wherein the UE number limit indicates the upper limit of one or more UEs to be involved in the cellular scheduling.

Step S602 in method 600 corresponds to step S502 in method 500 as described above. Similar with step S502, the outage margin may be adjusted in multiple ways at step S602.

At step S603, the target transmission power of the one of the at least one UE is determined based on the acquired path loss, the acquired full power and the adjusted outage margin.

In embodiments with respect to FIG. 6, the target transmission power of a UE which will cause an outage probability exceeding an outage probability threshold will not be set as zero any longer; instead, a proper power limitation may be determined for each of the at least UE as the target transmission power. Thus, the UE may not be strictly banning from the cellular communication.

In an embodiment, if the adjusted outage margin is in the form of equation (4), the target transmission power of the $i^{th}$ UE (denoted as "$\overline{P}_{i,c}$") may be determined based on the following equation (7):

$$\overline{P}_{i,c} = \min\left\{\left(e^{\left(-\frac{\sigma^2}{\lambda_0} - \log(1-\varepsilon)\right)/|S|} - 1\right)\lambda_0 / \overline{g}_{i,d}, \overline{P}_c\right\}. \qquad (7)$$

Thus, by comparing the full power of the $i^{th}$ UE $\overline{P}_c$ and a parameter obtained based on the acquired path loss $\overline{g}_{i,d}$ and the adjusted outage margin $$\left(-\frac{\sigma^2}{\lambda_0} - \log(1-\epsilon)\right) \Big/ |S|,$$

the minimum may be determined as the target transmission power of the $i^{th}$ UE.

Figure 7:
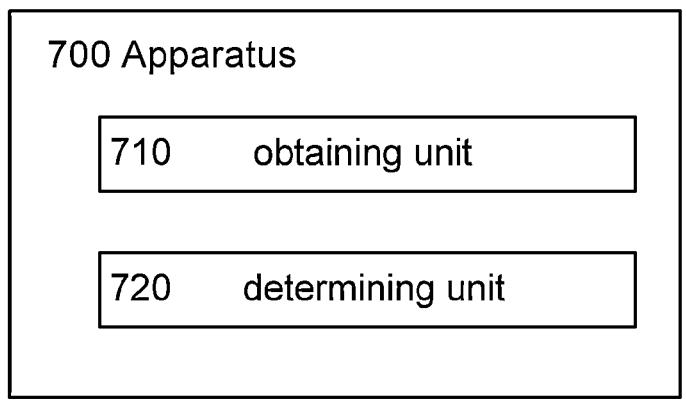
FIG. 7 illustrates a block diagram of an apparatus 700 for scheduling a UE in a communication system comprising D2D communication and cellular communication according to embodiments of the invention.

Reference is now made to FIG. 7, which illustrates a block diagram of an apparatus 700 for scheduling a UE in a communication system comprising the D2D communication and the cellular communication according to embodiments of the invention. According to embodiments of the present invention, the cellular communication may be performed between a BS and at least one UE, and the D2D communication may be performed between a D2D transmitter and a D2D receiver. According to embodiments of the present invention, the communication system may be implemented with a GSM system, a CDMA system, a UMTS system, a LTE system, etc., such as the system illustrated in FIG. 1. In accordance with embodiments of the present invention, the apparatus 700 may be implemented in, for example, a base station, a base station controller (BSC), a gateway, a relay, a server, or any other applicable device.

As shown, the apparatus 700 comprises: an obtaining unit 710 configured to obtain an outage margin of the D2D communication, wherein the outage margin indicates the margin that the communication from the D2D transmitter to the D2D receiver is in outage; and a determining unit 720 configured to determine, based on the outage margin, a target transmission power of the at least one UE to perform cellular scheduling.

In accordance with embodiments of the present invention, the obtaining unit 710 of the apparatus 700 may comprise: first acquiring means configured to acquire a path loss of the D2D transmitter to the D2D receiver, power limit of the D2D transmitter and power of Gaussian noise at the D2D receiver; regulating means configured to regulate transmission rate of the D2D communication and outage probability threshold of the D2D communication; and obtaining means configured to obtain the outage margin based on the path loss of the D2D transmitter to the D2D receiver, the power limit of transmission power of the D2D transmitter, the power of Gaussian noise at the D2D receiver, the transmission rate of the D2D communication and the outage probability threshold of the D2D communication.

In accordance with embodiments of the present invention, the determining unit 720 of the apparatus 700 may comprise: second acquiring means configured to acquire a path loss of one of the at least one UE to the D2D receiver; first determining means configured to determine an outage probability caused by the one of the at least one UE will exceed an outage probability threshold based on the acquired path loss and the outage margin; and first setting means configured to set the target transmission power of the one of the at least one UE as zero in response to determining that the outage probability caused by the one of the at least one UE will exceed the outage probability threshold.

In accordance with embodiments of the present invention, the determining unit 720 of the apparatus 700 may comprise: third acquiring means configured to acquire a path loss of one of the at least one UE to the D2D receiver; first adjusting means configured to adjust the outage margin according to a UE number limit, wherein the UE number limit indicates the upper limit of one or more UEs to be involved in the cellular scheduling; second determining means configured to determine whether an outage probability caused by the one of the at least one UE will exceed an outage probability threshold based on the acquired path loss and the adjusted outage margin; and second setting means configured to set the target transmission power of the one of the at least one UE as zero in response to determining that the outage probability caused by the one of the at least one UE will exceed the outage probability threshold.

In accordance with embodiments of the present invention, the determining unit 720 of the apparatus 700 may comprise: fourth acquiring means configured to acquire a path loss of one of the at least one UE to the D2D receiver and full power of the one of the at least one UE; second adjusting means configured to adjust the outage margin according to a UE number limit, wherein the UE number limit indicates the upper limit of one or more UEs to be involved in the cellular scheduling; and third determining means configured to determine the target transmission power of the one of the at least one UE based on the acquired path loss, the acquired full power and the adjusted outage margin.

In accordance with embodiments of the present invention, the first adjusting means or the second adjusting means may comprise: first calculating means configured to calculate an average outage margin by dividing the outage margin by the UE number limit; and first updating means configured to update the outage margin with the average outage margin.

In accordance with embodiments of the present invention, the first adjusting means or the second adjusting means may comprise: second calculating means configured to calculate an average outage margin by dividing the outage margin by the UE number limit; third calculating means configured to calculate a weight for the each of the at least one UE based on path loss or average channel gain of the each of the at least one UE to the D2D receiver; weighting means configured to weight the average outage margin by the calculated weight; and second updating means configured to update the outage margin with the weighted average outage margin.

In accordance with embodiments of the present invention, the second acquiring means, the third acquiring means or the fourth acquiring means may comprise: notifying means configured to notify the D2D receiver to listen to reference signals transmitted from the one of the at least one UE to the BS, so that D2D receiver obtains the path loss of the one of the at least one UE to the D2D receiver; and fifth acquiring means configured to acquire the path loss of the one of the at least one UE to the D2D receiver from the D2D receiver.

It is noted that the apparatus 700 may be configured to implement functionalities as described with reference to FIGS. 2-6. Therefore, the features discussed with respect to any of methods 200, 300, 400, 500 and 600 may apply to the corresponding components of the apparatus 700. It is further noted that the components of the apparatus 700 may be embodied in hardware, software, firmware, and/or any combination thereof. For example, the components of the apparatus 700 may be respectively implemented by a circuit, a processor or any other appropriate selection device. Those skilled in the art will appreciate that the aforesaid examples are only for illustration not limitation.

In some embodiment of the present disclosure, the apparatus 700 comprises at least one processor. The at least one processor suitable for use with embodiments of the present disclosure may include, by way of example, both general and special purpose processors already known or developed in the future. The apparatus 700 further comprises at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause the apparatus 700 to at least perform according to any of methods 200-600 as discussed above.

In view of the above, those skilled in the art will appreciate that with the methods and/or apparatus according to embodiments of the present invention, the throughput of the communication system comprising both the D2D communication and the cellular communication can be significantly improved.

Based on the above description, the skilled in the art would appreciate that the present disclosure may be embodied in an apparatus, a method, or a computer program product. In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flowcharts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The various blocks shown in FIGS. 2-6 may be viewed as method steps, and/or as operations that result from operation of computer program code, and/or as a plurality of coupled logic circuit elements constructed to carry out the associated function(s). At least some aspects of the exemplary embodiments of the disclosures may be practiced in various components such as integrated circuit chips and modules, and that the exemplary embodiments of this disclosure may be realized in an apparatus that is embodied as an integrated circuit, FPGA or ASIC that is configurable to operate in accordance with the exemplary embodiments of the present disclosure.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purposes of limitation.

What is claimed is:

1. A method for scheduling a user equipment (UE) in a communication system comprising Device-to-Device (D2D) communication and cellular communication, wherein the cellular communication is performed between a base station (BS) and at least one UE, and the D2D communication is performed between a D2D transmitter and a D2D receiver, the method comprising:
    obtaining an outage margin of the D2D communication, wherein the outage margin indicates the margin that the communication from the D2D transmitter to the D2D receiver is in outage;
    determining, based on the outage margin of the D2D communication, a target transmission power of the at least one UE to perform cellular scheduling; and
    scheduling the UE in a subsequent cellular communication based on the target transmission power of the at least one UE.

2. The method of claim 1, wherein obtaining an outage margin of the D2D communication comprises:
    acquiring a path loss of the D2D transmitter to the D2D receiver, power limit of the D2D transmitter and power of Gaussian noise at the D2D receiver;
    regulating transmission rate of the D2D communication and outage probability threshold of the D2D communication; and
    obtaining the outage margin based on the path loss of the D2D transmitter to the D2D receiver, the power limit of the D2D transmitter, the power of Gaussian noise at the D2D receiver, the transmission rate of the D2D communication and the outage probability threshold of the D2D communication.

3. The method of claim 1, wherein determining, based on the outage margin, a target transmission power of the at least one UE to perform cellular scheduling comprises:
    acquiring a path loss of one of the at least one UE to the D2D receiver;
    determining whether an outage probability caused by the one of the at least one UE will exceed an outage probability threshold based on the acquired path loss and the outage margin; and
    in response to determining that the outage probability caused by the one of the at least one UE will exceed the outage probability threshold, setting the target transmission power of the one of the at least one UE as zero.

4. The method of claim 1, wherein determining, based on the outage margin, a target transmission power of the at least one UE to perform cellular scheduling comprises:
  acquiring a path loss of one of the at least one UE to the D2D receiver;
  adjusting the outage margin according to a UE number limit, wherein the UE number limit indicates the upper limit of one or more UEs to be involved in the cellular scheduling;
  determining whether an outage probability caused by the one of the at least one UE will exceed an outage probability threshold based on the acquired path loss and the adjusted outage margin; and
  in response to determining that the outage probability caused by the one of the at least one UE will exceed the outage probability threshold, setting the target transmission power of the one of the at least one UE as zero.

5. The method of claim 1, wherein determining, based on the outage margin, a target transmission power of the at least one UE to perform cellular scheduling comprises:
  acquiring a path loss of one of the at least one UE to the D2D receiver and full power of the one of the at least one UE;
  adjusting the outage margin according to a UE number limit, wherein the UE number limit indicates the upper limit of one or more UEs to be involved in the cellular scheduling; and
  determining the target transmission power of the one of the at least one UE based on the acquired path loss, the acquired full power and the adjusted outage margin.

6. The method of claim 3, wherein acquiring a path loss of one of the at least one UE to the D2D receiver comprises:
  notifying the D2D receiver to listen to reference signals transmitted from the one of the at least one UE to the BS, so that D2D receiver obtains the path loss of the one of the at least one UE to the D2D receiver; and
  acquiring the path loss of the one of the at least one UE to the D2D receiver from the D2D receiver.

7. The method of claim 4, wherein adjusting the outage margin according to a UE number limit comprises:
  calculating an average outage margin by dividing the outage margin by the UE number limit; and
  updating the outage margin with the average outage margin.

8. The method of claim 4, wherein adjusting the outage margin according to a UE number limit comprises:
  calculating an average outage margin by dividing the outage margin by the UE number limit;
  calculating a weight for each of the at least one UE based on path loss or average channel gain of the each of the at least one UE to the D2D receiver;
  weighting the average outage margin by the calculated weight; and
  updating the outage margin with the weighted average outage margin.

9. An apparatus for scheduling a user equipment (UE) in a communication system comprising Device-to-Device (D2D) communication and cellular communication, wherein the cellular communication is performed between a base station (BS) and at least one UE, and the D2D communication is performed between a D2D transmitter and a D2D receiver, the apparatus comprising:
  at least one processor configured to execute:
    an obtaining unit configured to obtain an outage margin of the D2D communication, wherein the outage margin indicates the margin that the communication from the D2D transmitter to the D2D receiver is in outage;
    a determining unit configured to determine, based on the outage margin of the D2D communication, a target transmission power of the at least one UE to perform cellular scheduling and
    a scheduling unit configured to schedule the UE in a subsequent cellular communication based on the target transmission power of the at least one UE.

10. The apparatus of claim 9, wherein the obtaining unit comprises:
  a first acquiring unit configured to acquire a path loss of the D2D transmitter to the D2D receiver, power limit of the D2D transmitter and power of Gaussian noise at the D2D receiver;
  a regulating unit configured to regulate transmission rate of the D2D communication and outage probability threshold of the D2D communication; and
  an obtaining unit configured to obtain the outage margin based on the path loss of the D2D transmitter to the D2D receiver, the power limit of transmission power of the D2D transmitter, the power of Gaussian noise at the D2D receiver, the transmission rate of the D2D communication and the outage probability threshold of the D2D communication.

11. The apparatus of claim 9, wherein the determining unit comprises:
  a second acquiring unit configured to acquire a path loss of one of the at least one UE to the D2D receiver;
  a first determining unit configured to determine whether an outage probability caused by the one of the at least one UE will exceed an outage probability threshold based on the acquired path loss and the outage margin; and
  a first setting unit configured to set the target transmission power of the one of the at least one UE as zero in response to determining that the outage probability caused by the one of the at least one UE will exceed the outage probability threshold.

12. The apparatus of claim 9, wherein the determining unit comprises:
  a third acquiring unit configured to acquire a path loss of one of the at least one UE to the D2D receiver;
  a first adjusting unit configured to adjust the outage margin according to a UE number limit, wherein the UE number limit indicates the upper limit of one or more UEs to be involved in the cellular scheduling;
  a second determining unit configured to determine whether an outage probability caused by the one of the at least one UE will exceed an outage probability threshold based on the acquired path loss and the adjusted outage margin; and
  a second setting unit configured to set the target transmission power of the one of the at least one UE as zero in response to determining that the outage probability caused by the one of the at least one UE will exceed the outage probability threshold.

13. The apparatus of claim 9, wherein the determining unit comprises:
  a fourth acquiring unit configured to acquire a path loss of one of the at least one UE to the D2D receiver and full power of the one of the at least one UE;
  a second adjusting unit configured to adjust the outage margin according to a UE number limit, wherein the UE number limit indicates the upper limit of one or more UEs to be involved in the cellular scheduling; and a third determining unit configured to determine the target transmission power of the one of the at least one UE based on the acquired path loss, the acquired full power and the adjusted outage margin.

14. The apparatus of claim 11, wherein the second acquiring unit comprises:
   a notifying unit configured to notify the D2D receiver to listen to reference signals transmitted from the one of the at least one UE to the BS, so that D2D receiver obtains the path loss of the one of the at least one UE to the D2D receiver; and
   a fifth acquiring unit configured to acquire the path loss of the one of the at least one UE to the D2D receiver from the D2D receiver.

15. The apparatus of claim 12, wherein the first adjusting unit comprises:
   a first calculating unit configured to calculate an average outage margin by dividing the outage margin by the UE number limit; and
   a first updating unit configured to update the outage margin with the average outage margin.

16. The apparatus of claim 12, wherein the first adjusting unit comprises:
   a second calculating unit configured to calculate an average outage margin by dividing the outage margin by the UE number limit;
   a third calculating unit configured to calculate a weight for the each of the at least one UE based on path loss or average channel gain of the each of the at least one UE to the D2D receiver;
   a weighting unit configured to weight the average outage margin by the calculated weight; and
   a second updating unit configured to update the outage margin with the weighted average outage margin.

17. The apparatus of claim 12, wherein the third acquiring unit comprises:
   a notifying unit configured to notify the D2D receiver to listen to reference signals transmitted from the one of the at least one UE to the BS, so that D2D receiver obtains the path loss of the one of the at least one UE to the D2D receiver; and
   a fifth acquiring unit configured to acquire the path loss of the one of the at least one UE to the D2D receiver from the D2D receiver.

18. The apparatus of claim 13, wherein the second adjusting unit comprises:
   a first calculating unit configured to calculate an average outage margin by dividing the outage margin by the UE number limit; and
   a first updating unit configured to update the outage margin with the average outage margin.

19. The apparatus of claim 13, wherein the second adjusting unit comprises:
   a second calculating unit configured to calculate an average outage margin by dividing the outage margin by the UE number limit;
   a third calculating unit configured to calculate a weight for the each of the at least one UE based on path loss or average channel gain of the each of the at least one UE to the D2D receiver;
   a weighting unit configured to weight the average outage margin by the calculated weight; and
   a second updating unit configured to update the outage margin with the weighted average outage margin.

20. The apparatus of claim 13, wherein the fourth acquiring unit comprises:
   a notifying unit configured to notify the D2D receiver to listen to reference signals transmitted from the one of the at least one UE to the BS, so that D2D receiver obtains the path loss of the one of the at least one UE to the D2D receiver; and
   a fifth acquiring unit configured to acquire the path loss of the one of the at least one UE to the D2D receiver from the D2D receiver.

\* \* \* \* \*